United States Patent
Sado et al.

(10) Patent No.: US 7,933,088 B2
(45) Date of Patent: Apr. 26, 2011

(54) DISK DRIVE HAVING A DISK OF DISCRETE-TRACK MEDIA TYPE

(75) Inventors: Hideo Sado, Ome (JP); Masatoshi Sakurai, Tokyo (JP); Yuji Sakai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 12/338,962

(22) Filed: Dec. 18, 2008

(65) Prior Publication Data

US 2009/0168228 A1 Jul. 2, 2009

(30) Foreign Application Priority Data

Dec. 27, 2007 (JP) ................................. 2007-338217

(51) Int. Cl.
*G11B 5/09* (2006.01)
*G11B 5/596* (2006.01)

(52) U.S. Cl. ..................... 360/48; 360/77.08; 360/78.14

(58) Field of Classification Search ......................... None
See application file for complete search history.

(56) References Cited

U.S. PATENT DOCUMENTS 5,402,278 A 3/1995 Morita
7,136,252 B2 * 11/2006 Tagami ..................... 360/77.08
2007/0139804 A1 * 6/2007 Ito et al. ........................ 360/48
2009/0027802 A1 * 1/2009 Kim ............................. 360/77.08
2009/0147402 A1 * 6/2009 Sul et al. ..................... 360/131

FOREIGN PATENT DOCUMENTS

| JP | 04-103023 | 4/1992 |
| JP | 06-259709 | 9/1994 |
| JP | H11-45528 | 2/1999 |
| JP | 2000-322849 | 11/2000 |
| JP | 2004-110896 | 4/2004 |
| JP | 2006-031846 | 2/2006 |
| JP | 2006-31846 A | 2/2006 |
| JP | 2006-048861 | 2/2006 |
| JP | 2006-114079 A | 4/2006 |
| JP | 2006-228348 A | 8/2006 |
| JP | 2006-236461 | 9/2006 |
| JP | 2007-265530 | 10/2007 |
| JP | 2008-243266 | 10/2008 |

OTHER PUBLICATIONS

Office Action for Japanese Patent Application No. 2007-338217, mailed Mar. 3, 2009.

* cited by examiner

*Primary Examiner* — Daniell L Negrón
(74) *Attorney, Agent, or Firm* — Knobbe, Martens, Olson & Bear LLP (57) ABSTRACT

According to one embodiment, a disk drive has a DTM type disk. The DTM type disk has a servo area on one recording surface. In the servo area, a servo pattern is recorded. The servo pattern is composed of a projection-depression pattern and an N- and P-pole magnetic pattern. The N- and P-pole magnetic pattern is recorded in an address-data region that contains a cylinder code.

20 Claims, 9 Drawing Sheets

DISK DRIVE HAVING A DISK OF DISCRETE-TRACK MEDIA TYPE

CROSS-REFERENCE TO RELATED APPLICATIONS

This application is based upon and claims the benefit of priority from Japanese Patent Application No. 2007-338217, filed Dec. 27, 2007, the entire contents of which are incorporated herein by reference.

BACKGROUND

1. Field

One embodiment of the present invention relates to a disk drive using a disk of discrete-track media type as a magnetic recording medium.

2. Description of the Related Art

In the field of disk drives, a representative example of which is a hard disk drive, a disk of discrete-track media (DTM) type has been attracting attention in recent years. (See, for example, Jon. Pat. Appln. KOKAI Publications Nos. 2006-31846, 2006-228348 and 11-45528.) The DTM type disk is also called "patterned media type disk" or "discrete-track recording (DTR) type disk."

The DT type disk comprises, as basic components, a disk substrate, servo areas provided on the disk substrate, and data areas provided on the disk substrate. Each servo area has magnetic projection-depression patterns, each consisting of projecting magnetic parts and concaved nonmagnetic parts (actually, spaces). The data area has data tracks.

During the manufacturing the DTM disk, it is demanded that the area ratio of magnetic parts (projection-to-depression ratio) be uniform over the entire disk so that a pressure may be uniformly applied to the substrate, particularly while the magnetic layer is being physically processed. To render the area ratio of magnetic parts (projection-to-depression ratio) uniform over the entire disk, the servo patterns provided in the servo areas (servo sectors), each being a magnetic projection-depression pattern, should be uniform, too. The servo patterns are servo data items that are used to achieve the head-positioning control.

Some of the above-identified prior-art publications disclose the technique of providing recording areas on the disk, in which to write servo data. If the disk has such servo-data writing areas, however, the projection-to-depression ratio will change while the disk is being processed, inevitably resulting in non-uniform application of pressure. The above-identified prior-art publications also disclose a technique of generating cylinder codes (address data) in each servo pattern, by a physical process such as etching. However, an extremely fine physical process must be performed in order to generate cylinder codes. This lowers the yield of disk manufacturing. Some of the above-identified prior-art publications indeed disclose the technique of forming magnetic projection-depression patterns on one side of the disk, while forming servo patterns, i.e., flux-reversal patterns, on the other side of the disk. In this case, cylinder codes are recorded on one side of the disk, by means of a physical process. This inevitably reduces the yield of disk manufacturing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a disk drive using a DTM type disk that has servo patterns on the same recording surface, each servo pattern consisting of a projection-depression magnetic pattern and an N- and S-pole magnetic pattern. Therefore, the projection-depression magnetic pattern can have a uniform projection-to-depression ratio, and the servo patterns can be formed without performing a fine physical process.

(Configuration of the Disk Drive)

Figure 1:
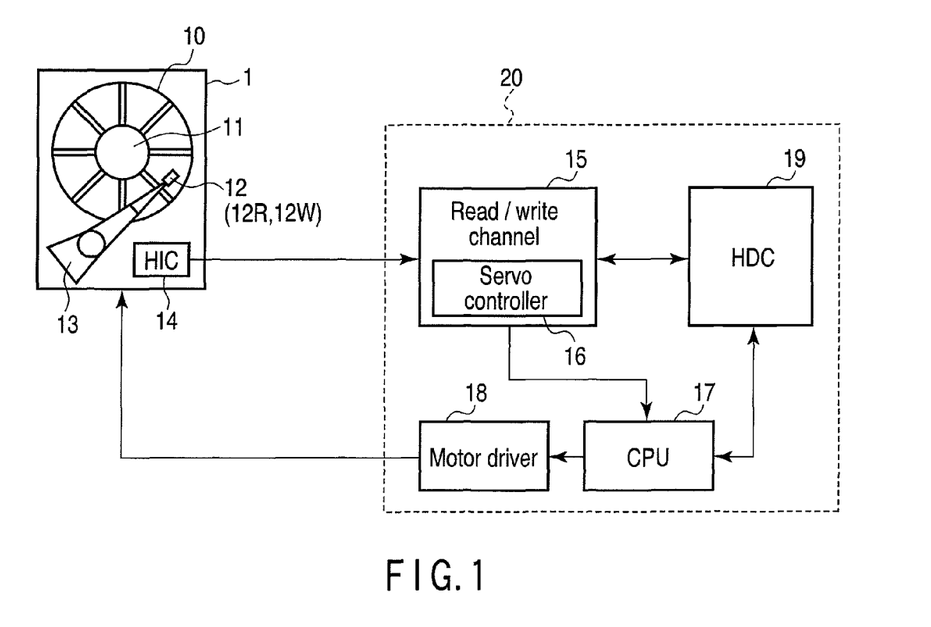
FIG. 1 is a block diagram showing the major components of a disk drive according an embodiment of this invention.

FIG. 1 is a block diagram showing the major components of a disk drive 1 according an embodiment of this invention.

The disk drive 1 has a disk 10, a spindle motor 11, a magnetic head 12, an actuator 13, a head amplifier (head IC) 14, and a printed circuit board (PCB) 20.

The spindle motor 11 can rotate the disk 10 at high speed. In this embodiment, the disk 10 is a discrete-track media (DTM) type one. The DTM type disk is also called "patterned media type disk" or "discrete-track recording (DTR) type disk." The disk 10 is also a magnetic recording medium of perpendicular magnetic recording scheme.

The magnetic head 12 is a head comprising a read head 12R and a write head 12W that are spaced apart. The read head 12R can read servo patterns from the servo areas (servo sectors) provided on the disk 10. As will be described later, each servo pattern is servo data and a sector address, and a servo-burst pattern. The servo data contains a track address (cylinder code). The write head 12W can write user data in data tracks provided in data areas, and can write address data and the like in the servo sectors during the self-servo writing operation.

The actuator 13 holds the magnetic head 12. When driven by a voice coil motor (VCM), the actuator 13 moves the magnetic head 12 in the radial direction of the disk 10. The voice coil motor is controlled and driven by a motor driver 18 mounted on the PCB 20. The head amplifier 14 amplifies a read signal (servo pattern or user data) read by the read head 12R. The read signal amplified is output to a read/write channel (signal-processing unit) 15 mounted on the PCB 20.

The PCB 20 holds not only the read/write channel 15 and the motor driver 18, but also a microprocessor (CPU) 17 and a hard disk controller (HDC) 19. The read/write channel 15 is a signal-processing unit that processes read/write signals. The read/write channel 15 includes a servo controller 16 that reproduces servo data from a read signal supplied from the read head 12R.

The servo data reproduced by the servo controller 16 is output to the CPU 17. More precisely, the position-error data the servo controller 16 from servo-burst patterns (A to D) is output to the CPU 17. The CPU 17 is the main controller of the disk drive 1 and performs head-positioning control in accordance with the servo data and the position-error data. The motor driver 18 includes a VCM driver and an SPM driver. The VCM driver supplies a drive current to the voice coil motor when it is controlled by the CPU 17. The SPM driver supplies a drive current to the spindle motor 11 when it is controlled by the CPU 17.

The HDC 19 is an interface that transfers data between the disk drive 1 and a host system provided outside the disk drive 1. When controlled by the CPU 17, the HDC 19 receives user data from the read/write channel 15 and transfers the user data to the host system. The HDC 19 can also receive data from the host system and transfers the data to the read/write channel 15.

(Structure of the Disk and Manufacture Thereof)

Figure 2:
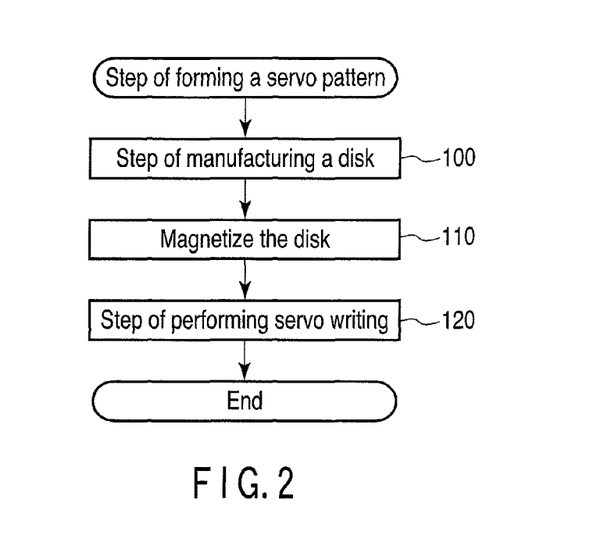
FIG. 2 is a flowchart explaining the steps of manufacturing a disk.

The steps of manufacturing the disk 10 according to the embodiment will be described, with reference to the flowchart of FIG. 2 and to FIGS. 3A to 3D. FIGS. 3A to 3D are sectional views of the disk 10.

Figure 3A:
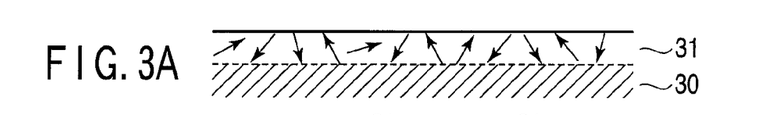
FIGS. 3A to 3D are diagrams explaining the steps of manufacturing the disk.
Figure 3B:
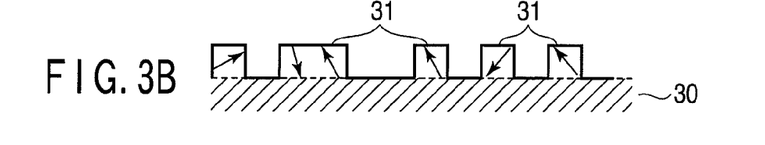
Figure 3C:
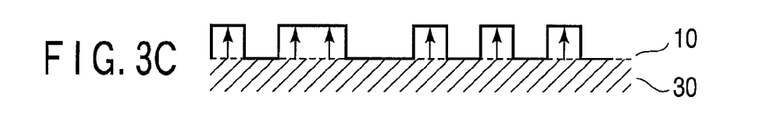

First, such a disk as shown in FIG. 3A is prepared, which comprises a substrate 30 and a magnetic layer 31 formed on the substrate 30. Then, a magnetic process is performed on the magnetic layer 31 as shown in FIG. 3B (Block 100). Further, the magnetic layer 31 is magnetized as shown in FIG. 3C, changing the disk to such a DTM type disk 10 as shown in FIG. 3C (Block 110).

Figure 3D:
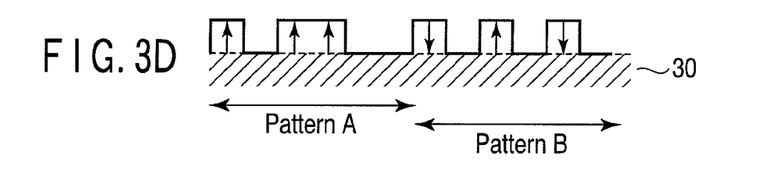

Next, in a servo-writing step, servo patterns (servo data) A and B are magnetically recorded as shown in FIG. 3D, in the servo areas (servo sectors) provided on the DTM type disk 10 (Block 120). As pointed out above, the disk 10 is a magnetic recording medium of perpendicular magnetic recording scheme. Therefore, a direct-current magnetic field is applied to the disk 10, recording servo patterns that can be reproduced.

Figure 4:
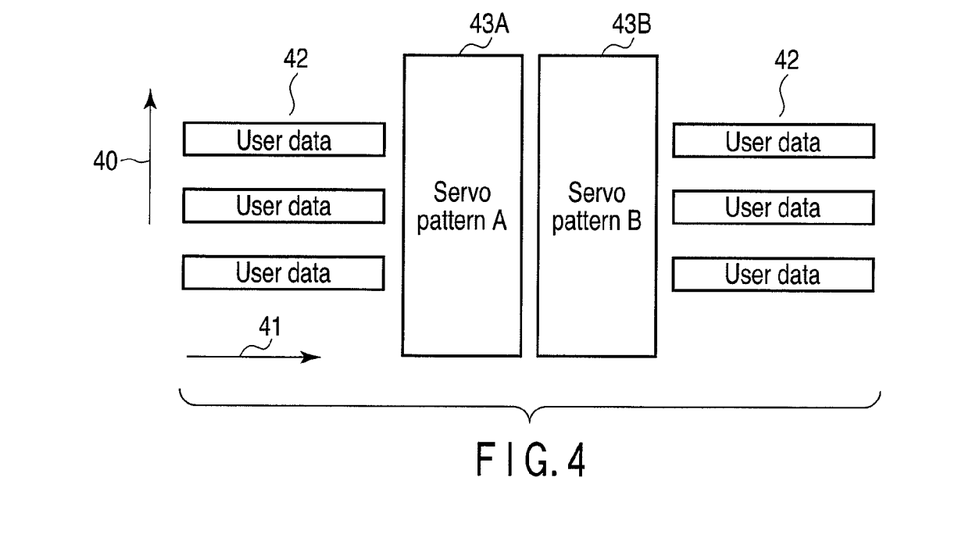
FIG. 4 is a diagram illustrating the structure of a disk according to the embodiment.

FIG. 4 is a diagram illustrating the data areas 42 provided on the DTM type disk 10 and the servo areas 43A and 43B provided on the disk 10 in the servo-writing step. In FIG. 4, reference number 40 denotes the radial direction of the disk 10, and reference number 41 denotes the circumferential direction of the disk 10.

In the data areas 42, a plurality of data tracks are provided. Each data track is composed of projecting magnetic parts for recoding user data. The spaces between the data tracks are guard bands, each being a concaved nonmagnetic part.

The servo areas 43A and 43B are areas included in each of the servo sectors that extend in the radial direction of the disk 10. The servo sectors are spaced part at regular intervals in the circumferential direction of the disk 10. In the servo area 43A, a servo pattern A (first servo pattern) is recoded. The servo pattern A is composed of a projecting magnetic part and a concaved nonmagnetic part. The servo pattern A is a pattern that corresponds to, for example, a preamble region (region for recording a sync signal or the like) and a servo mark region (region for recording a servo-pattern detecting signal).

In the servo area 43B, a servo pattern B (second servo pattern) is recorded. The servo pattern B is an N- and S-pole magnetic pattern that represents address data containing servo data items such as a cylinder code (track address) and a sector address. The servo-burst pattern included in the servo data is defined by projecting magnetic parts and concaved nonmagnetic parts and corresponds to the servo pattern A.

In the disk drive 1 that incorporates the disk 10 having the structure described above, the read/write channel 15 reproduces servo data containing the servo patterns A and B and servo-burst patterns (not shown) read by the read head 12R. The servo data thus reproduced is output to the CPU 17. The CPU 17 controls and drives the actuator 13, in accordance with the servo data. So driven, the actuator 13 moves the magnetic head 12 to a target position over the disk 10, positioning the magnetic head 12 at a target track.

Having the structure described above, the DTM type disk 10 according to the embodiment can record the address data including cylinder codes (track addresses) and sector addresses, in the form of servo pattern B, i.e., an N- and S-pole magnetic pattern. Thus, cylinder codes need not be defined by a projection-depression magnetic pattern composed of projecting magnetic parts and concaved nonmagnetic parts that can be formed only an extremely fine physical process only. This can increase the yield of manufacture of the disk 10. Further, the disk drive 1 can perform self-servo writing, writing the address data containing the cylinder codes, because the servo area 43B is a region for recording the servo pattern B that is an N- and S-pole magnetic pattern.

Since each servo sector has an N- and S-pole magnetic pattern, not a projection-depression pattern, the projection-to-depression ratio can be uniform in the servo area. It is therefore easy to apply a uniform pressure to the substrate in the course of manufacturing the disk 10. In other words, the disk 10 has no areas for a projection-depression pattern that corresponds to the servo pattern B defining the address data containing the cylinder code. Hence, the projection-to-depression ratio of the entire projection-depression pattern can be easily made uniform.

Figure 5:
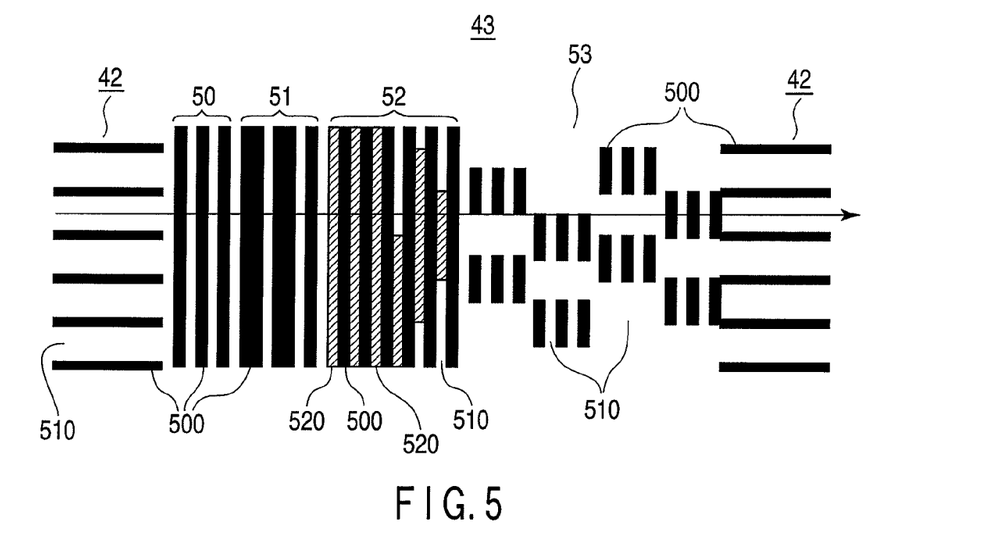
FIG. 5 is a diagram explaining the structure of a disk according to a first example of the embodiment.

FIG. 5 is a diagram explaining a structure (first example) the DTM type disk 10 may have in the embodiment. In FIG. 5, the black stripes are concaved nonmagnetic parts 500, and the white stripes are projecting magnetic parts 510.

As FIG. 5 shows, the servo area (servo sector) 43, excluding the data areas 42 and the address areas 52, is a projection-depression pattern that is composed of nonmagnetic parts 500 and magnetic parts 510. That is, the data tracks, each composed of a magnetic part 510, and the guard bands, each composed of a nonmagnetic part 500, are provided in the data area 42.

The servo area (servo sector) 43 has a preamble region 50, a servo-mark region 51, an address-data region 52, and a servo-burst pattern region 53. The preamble region 50, servo-mark region 51, and servo-burst pattern region 53 are composed of projection-depression patterns (servo pattern A), each consisting of nonmagnetic parts 500 and magnetic parts 510.

The address-data region 52 is composed of N-pole projecting magnetic parts 510, S-pole projecting magnetic parts 520 and concaved nonmagnetic parts 500. That is, the address-data region 52 is a servo pattern B containing a cylinder code and is a magnetizing pattern (magnetization-direction pattern) that is composed of N-pole projecting magnetic parts 510 and S-pole projecting magnetic parts 520. As FIG. 5, shows, every second part of the address-data region 52, as viewed in the circumferential direction of the disk 10, is a nonmagnetic part 500.

Figure 6:
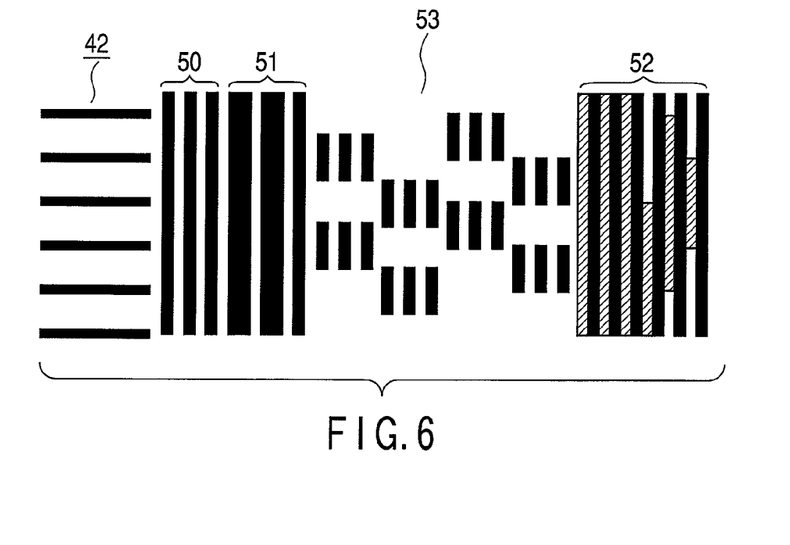
FIG. 6 is a diagram explaining the structure of a disk according to a second example of the embodiment.

FIG. 6 is a diagram explaining a structure (second example) the DTM type disk 10 may have in the embodiment.

The second example has a servo area 43, an address-data region 52, and a servo-burst pattern region 53. The address-data region 52 lies adjacent to the servo-burst pattern region 53 and is arranged at the end of the servo area 43.

Figure 7:
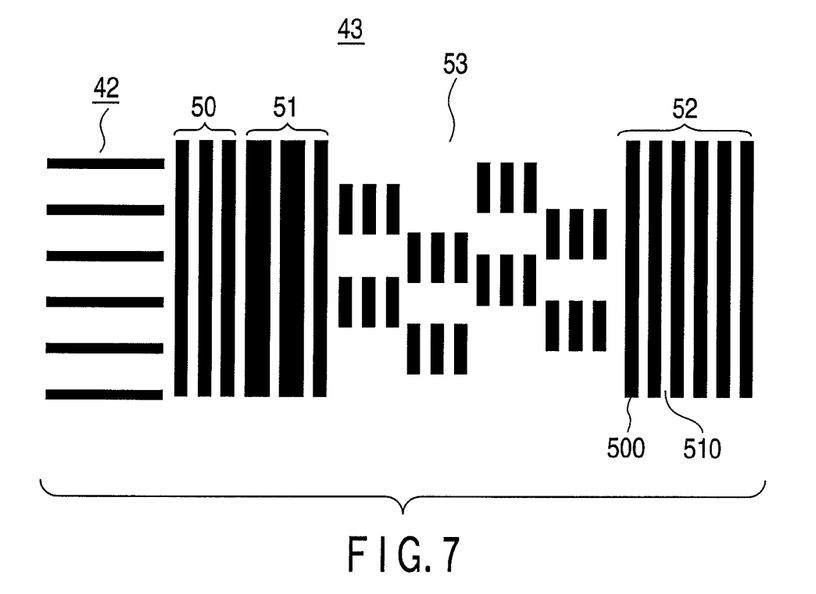
FIG. 7 is a diagram explaining a method of manufacturing the disk according to the second example.

FIG. 7 is a diagram explaining a method of manufacturing the second example of the DTM type disk 10. As explained with reference to FIG. 3B, the magnetic process, etching, is performed on the magnetic layer 31, forming such a pattern as shown in FIG. 7. This pattern is magnetized, whereby the DTM type disk 10 shown in FIG. 6 is manufactured.

Figure 8A:
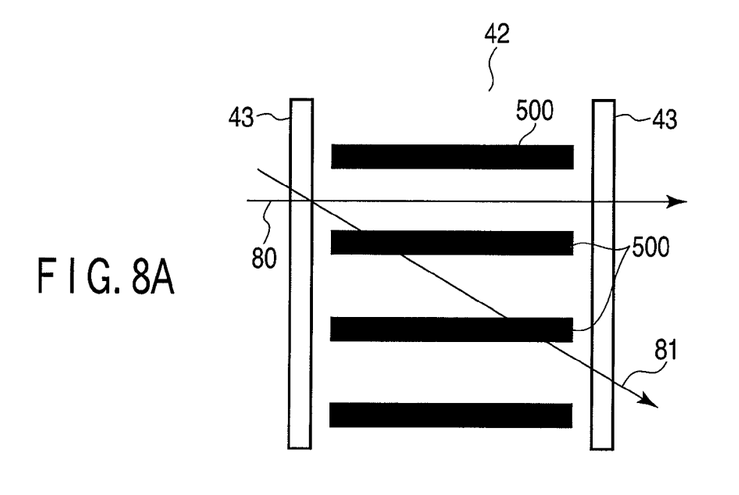
FIGS. 8A to 8C are diagrams explaining a method of measuring discrete tracks, according to the embodiment.
Figure 8B:
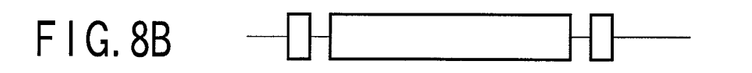
Figure 8C:
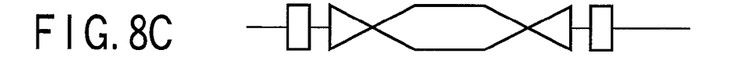

FIGS. 8A to 8C are diagrams that explain a method of measuring discrete tracks provided on the DTM type disk 10.

In this embodiment, the magnetic head 12 is moved to a position corresponding to the address address-data region 52 of the disk 10, when no cylinder codes are recorded in the disk 10. The self-servo writing is thus performed, writing data in the address-data region 52. To accomplish this self-servo writing, it is necessary to detect that the magnetic head 12 is positioned over the discrete tack. A method of measuring the discrete tack will be explained in detail.

First, a test signal of prescribed amplitude is written in a specified track on the DTM type track 10. As shown in FIG. 8A, the testing signal may be written two ways. It may be written as the magnetic head 12 moves relative to the disk 10, along the discrete track as indicated by line 80. Otherwise, it may be written as the magnetic head 12 moves relative to the disk 10, across the discrete track as indicated by line 81.

If the magnetic head 12 moves across the discrete track as indicated by line 81, it reads data from the nonmagnetic parts 500. In this case, the amplitude of the test signal reproduced is small. In view of this, the position of the magnetic head 12 is corrected not to reduce the amplitude of the signal at some parts thereof. In other words, the magnetic head 12 is so positioned that the signal reproduced may have such an amplitude as shown in FIG. 8B. The magnetic head 12 can thereby be positioned right above the discrete track. Instead of examining the amplitude of the reproduced signal as described above, how many tracks the head 12 has crossed to reduce the amplitude of the signal reproduced may be determined from the number of reproduction (decoding) errors.

In the disk drive 1, the read head 12R and write head 12W of the magnetic head 12 are mounted on the same slider, spaced apart from each other, and the magnetic head 12 is secured to the actuator 13, which is a rotary-type one. The position of the magnetic head 12 is determined by reproducing the servo pattern. More precisely, the position of the read head 12R is determined from the servo pattern reproduced. Hence, the position the write head 12W has relative to the read head 12R must be detected so that the write head 12W may perform self-servo writing to write data in the address-data region 52.

To detect the position the write head 12W has relative to the read head 12R, a head offset is detected in the disk drive 1. In the present embodiment, a test pattern is recorded in a track, or, data area 42. The position of the test pattern recorded is searched for. The position the write head 12W has relative to the read head 12R can thereby be detected. Thus, in this embodiment, the disk drive 1 first detect the position the write head 12W has relative to the read head 12R and then adjust the position of the write head 12W. So adjusted in position, the write head 12W performs self-servo writing, writing data in the address-data region 52.

Figure 9:
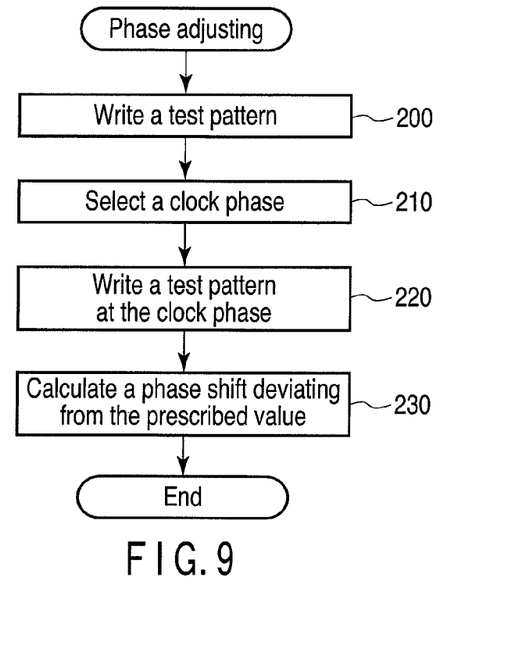
FIG. 9 is a flowchart explaining a method of examining the write-clock phase of a test pattern in the embodiment.

FIG. 9 is a flowchart explaining a method of examining the write-clock phase of a test pattern in the embodiment.

That part of the offset value between the read head 12R and the write head 12W, which pertains to the radial direction of the disk 10, is measured as described above. The other part of the offset value, which pertains to the circumferential direction of the disk 10 must be measured, too. The offset in the circumferential direction of the disk 10 can be evaluated by writing test data in the address-data region 52 and reading the same from the address-data region 52, as will be explained with reference to the flowchart of FIG. 9.

First, the test pattern is written in the address-data region 52. To be more specific, a sync signal reproduced from the preamble 50 formed by the magnetic process is used, achieving the clock-frequency/phase synchronization. Upon lapse of a preset period from the time the write head 12W passed the servo-mark region 51, the write head 12W writes the test pattern in the address-data region 52 (Block 200). At this point, various types of write clock phases are used. From these write clock phases, a write clock phase that causes no decoding errors is selected (Block 210). Using the write clock phase selected, the write head 12W writes the test pattern anew in the address-data region 52 (Block 220). This test pattern is reproduced, thereby detecting a phase shift deviating from a prescribed value, on the basis of the decoding result (Block 230).

Using the phase shift thus detected and the write clock phase, the write head 12W writes a cylinder code in the address-data region 52. A desirable servo pattern B can therefore be formed in the disk drive 1.

Figure 10A:
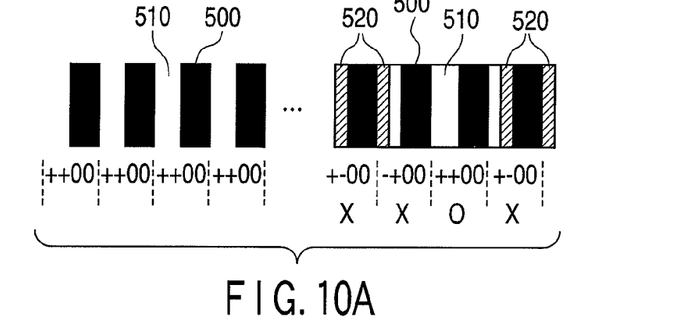
FIGS. 10A and 10B are diagrams defining a decoding error found in the method of examining the write-clock phase and explaining the method of examining the write-clock phase.
Figure 10B:
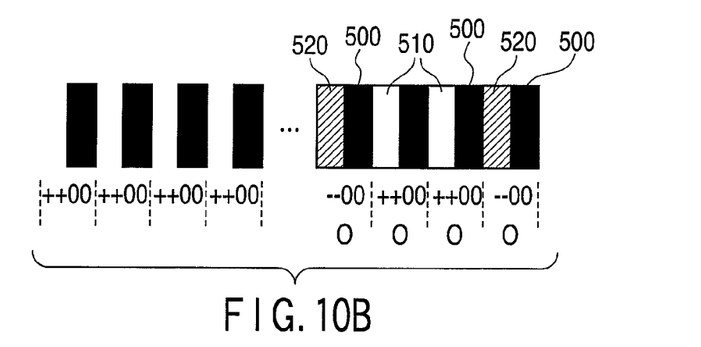

FIGS. 10A and 10B are diagrams defining a decoding error found in the method of examining the write-clock phase and explaining the method of examining the write-clock phase.

Such a test pattern as shown in FIG. 10A will be written if that part of the offset between the read head 12R and the write head 12W, which pertains to the circumferential direction of the disk 10, is not taken into consideration. This takes place if flux reversal develops in the magnetic parts 510 of the address-data region 52 that is similar to the preamble 50.

That is, using a clock signal synchronized in the preamble 50, a D/A converter acquires a reproduced signal, thereby generating a frame consisting of four samples that are alternately "magnetic" and "nonmagnetic." The frame is, of course, "++00" in the preamble 50. To obtain such a servo pattern as shown in FIG. 5 or FIG. 6, the D/A converter should convert the cylinder code in the address-data region 52 to data "++00" or "−−00." Therefore, "±00" and "∓00" are errors. Any decoding error in the cylinder code reproduced from the address-data region 52 can therefore be detected.

Figure 11A:
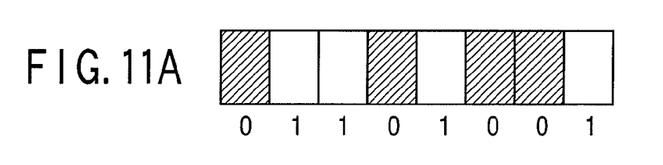
FIGS. 11A to 11C are diagrams defining a shift error found in the examination of the write-clock phase.
Figure 11B:
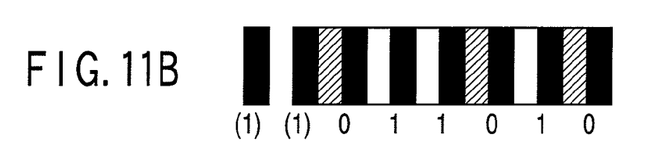
Figure 11C:
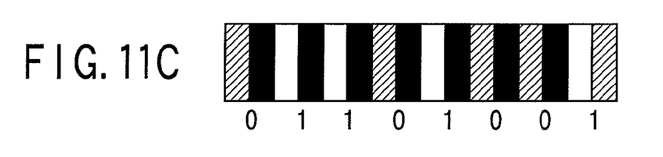

FIGS. 11A to 11C are diagrams defining a shift error found in the examination of the write-clock phase.

When such a test pattern as shown in FIG. 11A is written in the address-data region 52, the coarse shift may not be appropriately adjusted. In this case, such a test pattern as shown in FIG. 11B is written instead. Since the pattern just written in the region 52 is not identical to the pattern read from the region 51, a shift error is detected. Such a pattern as shown in FIG. 11C is discriminated as a normal pattern.

Figure 12:
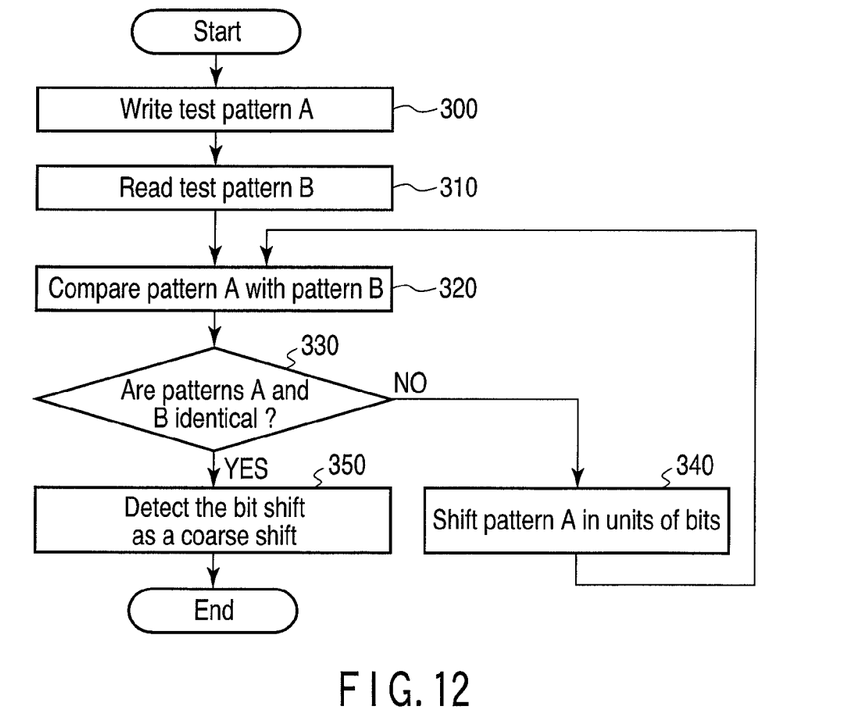
FIG. 12 is a flowchart explaining a method of detecting a coarse shift in the examination of the write-clock phase.

A method of detecting a coarse shift will be explained with reference to the flowchart of FIG. 12.

First, a test pattern A is written in the address-data region 52 (Block 300). A pattern B is read from the address-data region 52 (Block 310). The patterns A and B are compared (Block 320). If the patterns A and B are not found identical, a shift error has been made. In this case, the pattern A written is shifted in units of bits and compared again with the pattern B read (Block 340). If the patterns A and B are found identical, the bit shift of the pattern A written is detected as a coarse shift (Block 350).

Now that the coarse shift has been set to an appropriate value, a cylinder code is written in the address-data region 52. Such a desirable servo pattern as shown in FIG. 11C can therefore be written.

In practice, it is desired that a sufficiently long coarse delay should be set in the servo-burst pattern region 53 preceding the address-data region 52 in order not to write the cylinder code, and the test pattern should be written, thereby to reduce the coarse delay. To this end, the address-data region 52 should better be at the end of the servo pattern as illustrated in FIG. 6.

After the write-clock phase has been examined as described above, the disk drive 1 performs self-servo writing, writing the cylinder code in the address-data region 52. At this point, the preamble 50 formed by the magnetic process is reproduced, thereby achieving the clock-frequency/phase synchronization. The write head 12W can write the test pattern in the address-data region 52 upon lapse of a preset period from the time the write head 12W passed the servo-mark region 51.

In order to write the user data in the data track provided in the data area 42, there are reproduced the preamble 50, servo mark 51, servo pattern 53, which have been formed by a physical process, and the cylinder code written in the address-data region 52. From these servo data items, the CPU 17 calculates the position the magnetic head 12 has relative to the disk 10. After positioning the magnetic head 12 at the target track, the CPU 17 causes the magnetic head 12 to write the user data in the target track.

In the physical process performed on the disk 10 in the present embodiment, the nonmagnetic parts 500 may be or may not be embedded. Further, if the nonmagnetic parts 500 are embedded, it does not matter whether they are embedded in the magnetic layer or the substrate. The magnetic parts 510 are regions in which data can be recorded, whereas the nonmagnetic parts 500 are regions in which no data can be recorded.

Figure 13:
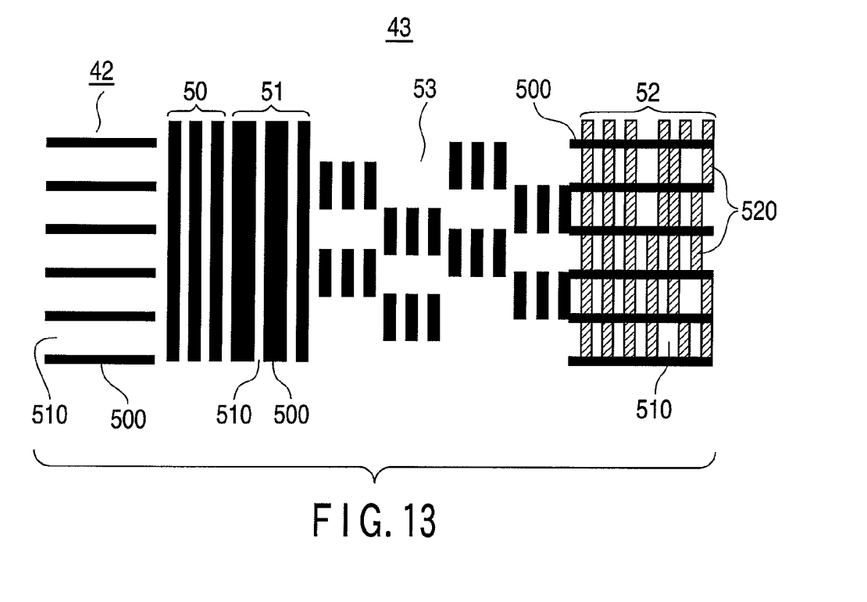
FIG. 13 is a diagram explaining the structure of a disk according to a third example of the embodiment.

FIG. 13 a diagram explaining a structure (third example) the DTM type disk 10 may have in the embodiment. In FIG. 13, the black stripes are concaved nonmagnetic parts 500, and the white stripes are projecting magnetic parts 510, exactly as in FIG. 5.

The address-data region 52 is composed of N-pole projecting magnetic parts 510, S-pole projecting magnetic parts 520 and concaved nonmagnetic parts 500. That is, the address-data region 52 is a servo pattern B containing a cylinder code and is a magnetizing pattern (magnetization-direction pattern) that is composed of N-pole projecting magnetic parts 510 and S-pole projecting magnetic parts 520. As FIG. 13 shows, the address-data region 52 has nonmagnetic parts 500 arranged at regular intervals in the radial direction of the disk 10 and extending in the circumferential direction of the disk 10.

Figure 14:
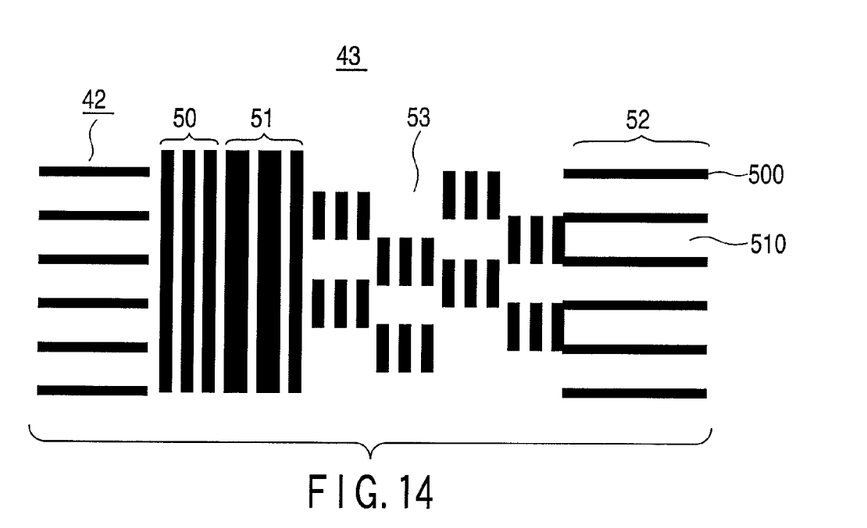
FIG. 14 is a diagram explaining a method of manufacturing the disk according to the second example.

FIG. 14 is a diagram explaining a method of manufacturing the DTM type disk according to the third example. As explained with reference to FIG. 3B, the magnetic process, etching, is performed on the magnetic layer 31, forming such a pattern as shown in FIG. 14. This pattern is magnetized, whereby the DTM type disk 10 shown in FIG. 13 is manufactured.

In the servo pattern of FIG. 14, the area ratio of the magnetic parts in the address-data region 52 including the cylinder code can be determined by how a pressure applied during the physical process is distributed in the magnetic layer. In order to achieve uniform processing of servo burst, the address-data region 52 has an area ratio equal to that (75% in FIG. 14) of the magnetic parts of the servo-burst pattern 53. Conversely, in order to achieve uniform processing of the discrete track, the address-data region 52 has an area ratio equal to that (75% in FIG. 14) of the discrete track (i.e., user data area 42).

The method of measuring the discrete track in this embodiment is identical to the method explained with reference to FIGS. 8A to 8C. As pointed out above, the position the write head 12W has relative to the read head 12R needs to be determined before the data is written in the address-data region 52 through the self-servo writing. To determine the position the write head 12W has relative to the read head 12R, the disk drive 1 detects the head offset value.

To this end, a test pattern is recorded in the data area 42, or data track, and the position of the test pattern is detected. The position the write head 12W has relative to the read head 12R can thereby be determined. After determining this position, the disk drive 1 adjusts the position of the write head 12W and then causes the write head 12W to write data in the address-data region 52 through the self-servo writing.

Further, the disk drive 1 performs self-servo writing, writing a cylinder code in the address-data region 52. That is, the preamble 50 formed by the magnetic process is reproduced, thereby accomplishing the clock-frequency/phase synchronization. The write head 12W can therefore write the cylinder code in the address-data region 52 upon lapse of a preset period from the time the write head 12W passed the servo-mark region 51. In order to write the user data in the data track provided in the data area 42, the preamble 50, servo mark 51, servo pattern 53, which have been formed by a physical process, and the cylinder code written in the address-data region 52 are reproduced. From these servo data items, the CPU 17 calculates the position the magnetic head 12 has relative to the disk 10. After positioning the magnetic head 12 at the target track, the CPU 17 causes the magnetic head 12 to write the user data in the target track.

Figure 17A:
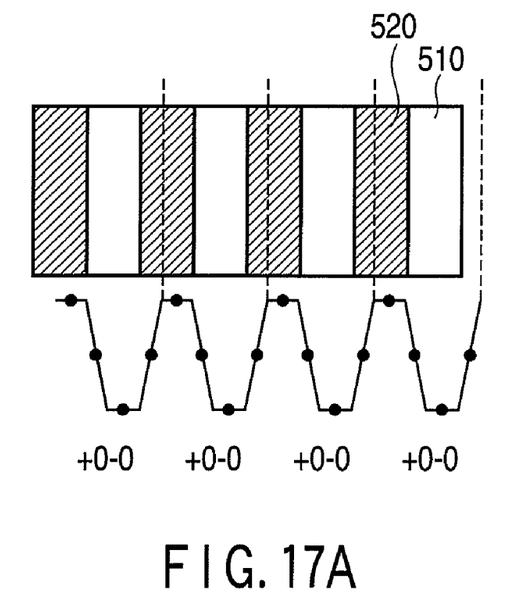
FIGS. 17A and 17B are diagrams explaining the characteristic of a reproduced test-pattern signal according to the third example.
Figure 17B:
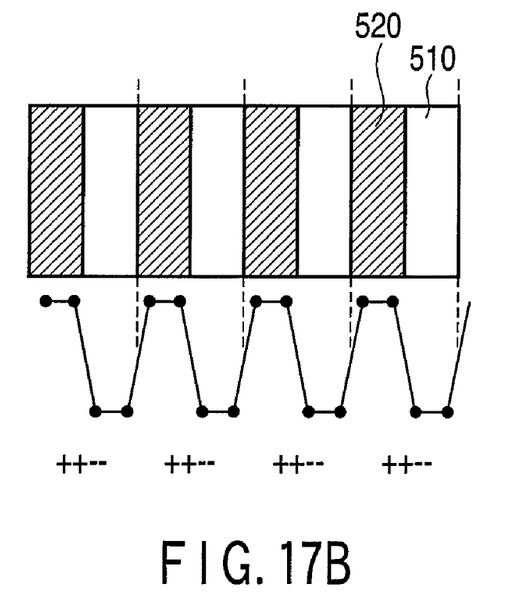

The clock phase at which to write the cylinder code may be or may not be adjusted beforehand. If this clock phase is not adjusted beforehand, a preamble pattern may be written at the head of the cylinder code to achieve clock synchronization at the time of data decoding. If this clock phase is not adjusted beforehand, the test pattern signal reproduced may have a value almost equal to zero (0) as shown in FIG. 17A, when it is acquired by the D/A converter. A test pattern having such characteristics may be utilized to acquire a clock phase that prevents the pattern signal from having zero-value as shown in FIG. 17B. After acquiring such a clock phase, the cylinder code may be written.

Figure 15:
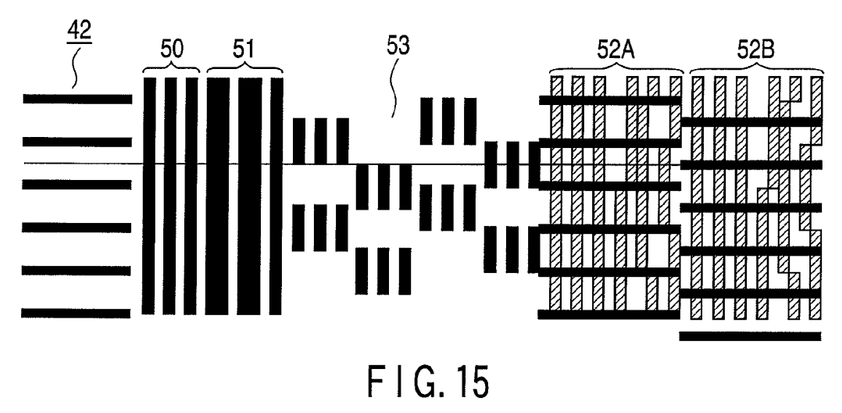
FIG. 15 is a diagram explaining the structure of a disk according to a fourth example of the embodiment.

FIG. 15 is a diagram explaining a structure (fourth example) the DTM type disk 10 may have in the embodiment. As FIG. 15 shows, the address-data region 52 is composed of a first address-data region 52A and a second address-data region 52B.

If the magnetic head 12 reproduces servo data containing a cylinder head as it passes a nonmagnetic part in the address-data region, no sufficient gains will be attained, particularly when the cylinder code is reproduced. Inevitably, an error may develop in decoding the cylinder code. This is why the address-data region is composed of first and second address-data regions 52A and 52B in this embodiment, as is illustrated in FIG. 15.

The first address-data region 52A is arranged at the same position as the burst patterns C and D of the servo-burst pattern 53, in the radial direction of the disk 10. Moreover, the second address-data region 52B is arranged, 0.5 tracks off the first address-data region 52A (that is, at the same position as the burst patterns A and B, in the radial direction).

Figure 16:
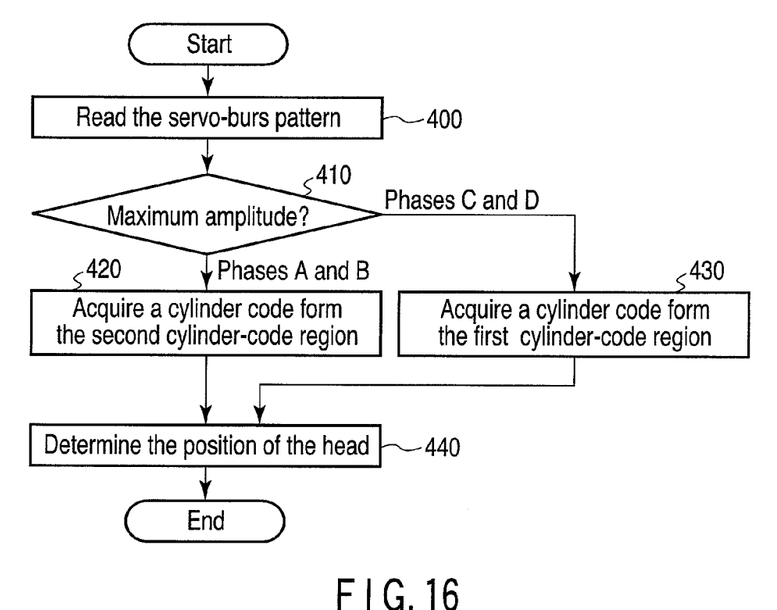
FIG. 16 is a flowchart explaining the sequence of generating position data in the fourth example.

FIG. 16 is a flowchart explaining the sequence of generating position data about the magnetic head 12 from the data items reproduced from the first and second address-data regions 52A and 52B.

First, the CPU 17 determines the amplitude of the servo-burst signal the read head 12R has read from the servo-burst pattern 53 (Blocks 400 and 410). The CPU 17 then determines the maximum phase of the burst pattern, from the amplitudes of burst patterns (burst patterns A and B, or burst patterns C and D). If the burst patterns C and D represent the maximum amplitude, the CPU 17 reproduces the cylinder code from the first address-data region 52A (Block 430).

If the burst patterns A and B represent the maximum amplitude, the CPU 17 reproduces the cylinder code from the first address-data region 52B (Block 420). From the cylinder code thus acquired, the CPU 17 then determines the position the magnetic head 12 has relative to the disk 10 (Block 440).

In this embodiment, the first address-data region 52A and the second address-data region 52B are arranged, 0.5 tracks off each other, as described above. The cylinder code can therefore be reproduced with a sufficient gain, based on the position of the magnetic head 12. Hence, errors in decoding the cylinder code can be suppressed.

A four-phase amplitude burst (A to D) has been exemplified to represent the positions the address-data regions 52A and 52B have in the radial direction of the disk. Nonetheless, the positions the address-data regions 52A and 52B may be indicated by phase-servo patterns or null-servo patterns, so far as either the address-data region 52A or the address-data region 52B can be selected.

In the embodiment, the disk is a DTM type disk, a patterned media type disk, or a DTR type disk, each having a projection-depression pattern. The disk is not limited to these types, nevertheless. For example, a disk having flat sides may be used if it has magnetic parts and nonmagnetic parts and if the nonmagnetic parts are embedded in concaves made in the disk substrate.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a head configured to read and write data;
a disk comprising a data area in which a plurality of data tracks made of magnetized portions are arranged in a radial direction, and a servo area, in which servo information is recorded, are provided on the same recording surface,
the servo area comprising:
a first servo pattern made of magnetic and nonmagnetic portions and comprising a preamble area; and
a second servo pattern comprising a magnetic pattern of N- and S-poles in a magnetic portion, and comprising an area in which address information is recorded.

2. The disk drive of claim 1, wherein the servo area comprises a plurality of servo sectors arranged at predetermined intervals in a circumferential direction, and the first servo pattern and the second servo pattern are recorded in each servo sector.

3. The disk drive of claim 2, wherein the first servo pattern is magnetized in the same direction.

4. The disk drive of claim 2, wherein the first servo pattern comprises an area in which a pattern representing a servo mark is recorded.

5. The disk drive of claim 1, wherein the first servo pattern is magnetized in the same direction.

6. The disk drive of claim 5, wherein the first servo pattern comprises an area in which a pattern representing a servo mark is recorded.

7. The disk drive of claim 1, wherein the first servo pattern comprises an area in which a pattern representing a servo mark is recorded.

8. A disk drive comprising:
a head configured to read and write data; and
a disk comprising a data area, in which a plurality of data tracks made of magnetic portions are arranged in a radial direction, and a servo area, in which servo information is recorded, are provided on the same recording surface,
the servo area comprising a plurality of servo sectors arranged at predetermined intervals in a circumferential direction, and
each servo sector comprising:
a first servo pattern made of magnetic and nonmagnetic portions; and
a second servo pattern comprising a magnetized pattern of N- and S-poles in a magnetic portion, and a nonmagnetic portion, the second servo pattern comprising an area in which address information is recorded.

9. The disk drive of claim 8, wherein the nonmagnetic portion of the second servo pattern is continuous in a radial direction of the disk.

10. The disk drive of claim 9, wherein
the first servo pattern comprises a preamble area.

11. The disk drive of claim 9, wherein the first servo pattern comprises an area in which a pattern representing a servo mark is recorded.

12. The disk drive of claim 8, wherein the nonmagnetic portion of the second servo pattern is continuous in a circumferential direction of the disk.

13. The disk drive of claim 12, wherein
the first servo pattern comprises a preamble area.

14. The disk drive of claim 12, wherein the first servo pattern comprises an area in which a pattern representing a servo mark is recorded.

15. The disk drive of claim 8, wherein
the first servo pattern comprises a preamble area.

16. The disk drive of claim 15, wherein the first servo pattern comprises an area in which a pattern representing a servo mark is recorded.

17. The disk drive of claim 8, wherein the first servo pattern comprises an area in which a pattern representing a servo mark is recorded.

18. The disk drive of claim 8, wherein the first servo pattern is magnetized in the same direction.

19. The disk drive of claim 18, wherein the first servo pattern comprises a preamble area.

20. The disk drive of claim 18, wherein the first servo pattern comprises an area in which a pattern representing a servo mark is recorded.

* * * * *